(12) United States Patent
Nagarkar et al.

(10) Patent No.: US 7,772,558 B1
(45) Date of Patent: Aug. 10, 2010

(54) MULTI-LAYER RADIATION DETECTOR AND RELATED METHODS

(75) Inventors: Vivek Nagarkar, Weston, MA (US); Valeriy Gaysinskiy, Allston, MA (US)

(73) Assignee: Radiation Monitoring Devices, Inc., Watertown, MA (US)

( * ) Notice: Subject to any disclaimer, the term of this patent is extended or adjusted under 35 U.S.C. 154(b) by 733 days.

(21) Appl. No.: 11/393,983

(22) Filed: Mar. 29, 2006

(51) Int. Cl.
*G01T 1/20* (2006.01)
(52) U.S. Cl. .................................. 250/361 R
(58) Field of Classification Search ............... 250/361 R
See application file for complete search history.

(56) References Cited

U.S. PATENT DOCUMENTS

| | | | |
|---|---|---|---|
| 5,171,996 A | | 12/1992 | Perez-Mendez |
| 6,031,234 A | * | 2/2000 | Albagli et al. ......... 250/370.11 |
| 6,469,305 B2 | | 10/2002 | Takabayashi et al. |
| 6,469,307 B2 | * | 10/2002 | Takabayashi et al. .. 250/370.11 |
| 6,921,909 B2 | | 7/2005 | Nagarkar et al. |
| 7,019,303 B2 | * | 3/2006 | Homme et al. ......... 250/370.11 |
| 7,019,304 B2 | * | 3/2006 | Albagli et al. ......... 250/370.11 |
| 2002/0158208 A1 | * | 10/2002 | Mori et al. ............. 250/370.11 |
| 2004/0042585 A1 | * | 3/2004 | Nagarkar et al. ........... 378/98.8 |
| 2007/0257198 A1 | * | 11/2007 | Ogawa et al. .......... 250/370.11 |

OTHER PUBLICATIONS

Nagarkar et al., "CCD-Based High Resolution Digital Radiography System for Non Destructive Evaluation," *IEEE Trans. Nucl. Sci.* 44:885-889 (1997).
Nagarkar et al., "Structured CsI(Tl) Scintillators for X-Ray Imaging Applications," *IEEE Trans. Nucl. Sci.* 45:492-496 (1998).
Nagarkar et al., "New Design of a Structured CsI(T1) Screen for Digital Mammography," *SPIE, Physics of Medical Imaging* 5030:541-546 (2003).
Shestakova et al., "A New Sensor for Thermal Neutro Imaging," *IEEE Trans. Nucl. Sci.* 52:1109-1113 (2005).
Nagarkar, "Combined Radionuclide and X-Ray Imaging Devices," (U.S. Appl. No. 11/158,938, filed Jun. 21, 2005).

* cited by examiner

*Primary Examiner*—David P Porta
*Assistant Examiner*—Kiho Kim
(74) *Attorney, Agent, or Firm*—Townsend and Townsend and Crew LLP

(57) ABSTRACT

The present invention provides radiation detectors and related methods, including methods of making radiation detectors and devices, as well as methods of performing radiation detection. A radiation detector includes a first resin coating formed on at least a surface of the substrate and an additional layer, such as a scintillator layer, formed on the resin coating.

22 Claims, 3 Drawing Sheets

MULTI-LAYER RADIATION DETECTOR AND RELATED METHODS

BACKGROUND OF THE INVENTION

The present invention relates generally to radiation detectors and devices. More specifically, the present invention relates to multi-layer radiation detectors and related methods, including methods of making radiation detectors and methods of performing radiation detection.

Scintillation spectrometers are widely used in detection and spectroscopy of energetic photons (e.g., X-rays and y-rays). Such detectors are commonly used, for example, in nuclear and particle physics research, medical imaging, diffraction, non destructive testing, nuclear treaty verification and safeguards, nuclear non-proliferation monitoring, and geological exploration.

A wide variety of scintillators are now available and new scintillator compositions are being developed. Among currently available scintillators, thallium-doped alkali halide scintillators have proven useful and practical in a variety of applications. One example includes thallium doped cesium iodide (CsI(Tl)), which is a highly desired material for a wide variety of medical and industrial applications due to its excellent detection properties, low cost, and easy availability. Having a high conversion efficiency, a rapid initial decay, an emission in the visible range, and cubic structure that allows fabrication into micro-columnar films (see, e.g., U.S. Pat. No. 5,171,996), CsI(Tl) has found use in radiological imaging applications. Furthermore, its high density, high atomic number, and transparency to its own light make CsI(Tl) a material of choice for x-ray and gamma ray spectroscopy, homeland security applications, and nuclear medicine applications such as intra-operative surgical probes and Single Photon Emission Computed Tomography or SPECT.

Scintillation spectrometry generally comprises a multi-step scheme. Specifically, scintillators work by converting energetic photons such as X-rays, gamma-rays, and the like, into a more easily detectable signal (e.g., visible light). Thus, incident energetic photons are stopped by the scintillator material of the device and, as a result, the scintillator produces light photons mostly in the visible light range that can be detected, e.g., by a suitably placed photodetector. Various possible scintillator detector configurations are known. In general, scintillator based detectors typically include a scintillator material optically coupled to a photodetector. In many instances, scintillator material is incorporated into a radiation detection device by first depositing the scintillator material on a suitable substrate. A suitable substrate can include a photodetector or a portion thereof, or a separate scintillator panel is fabricated by depositing scintillator on a passive substrate, which is then incorporated into a detection device. Fabrication of scintillator panels typically includes depositing scintillator material directly on a passive surface of a substrate, such as substrates made of glass, graphite, or having amorphous carbon as a major constituent.

Unfortunately, extensive processing of a substrate surface prior to direct scintillator deposition is often required since, for example, imperfections on the target surface may result in unacceptable performance or degradation of performance of the scintillator in a detection device. Such processing is time consuming and costly, and adds additional steps to detector manufacturing while often decreasing product yield. Additionally, different substrates can widely vary, for example, with respect to attributes such as physical characteristics (e.g., texture, hardness, permeability to moisture, and susceptibility to various forms of damage) and/or energy or light transmission properties. Thus, manufacturing processes separately tailored to each particular substrate may be required, further increasing detector manufacturing time and expense. Furthermore, suitability for direct deposition of certain scintillator materials may be limited only to certain substrate materials. For example, substrate surfaces coated with a reflective layer, such as silver, aluminum, and the like, and having a scintillator material such as CsI deposited thereon, may result in poor performance due, for example, to chemical corrosion or degradation, as the iodine in the scintillator can react with and tarnish the reflective coating.

Thus, a need exists for improved scintillator detector fabrication methods and radiation detectors that can make use of a variety of different substrates and scintillator compositions. In particular, new radiation detectors are needed that can be efficiently and economically produced and which can be fabricated using a variety of different substrates without the need for extensive processing or the need for individually tailored fabrication methodology, and which can make use of various scintillator and substrate combinations without loss of performance due, for example, to adverse chemical interactions or degradation of the detector performance.

BRIEF SUMMARY OF THE INVENTION

The present invention provides radiation detectors and related methods, including methods of making radiation detectors and devices, as well as methods of performing radiation detection. The radiation detectors of the present invention make use of a resin layer or coating that is deposited on a substrate and forms a surface onto which additional layers, including a layer of scintillator material, can be deposited. The resin coating is of a composition and design such that when the resin coating of the appropriate thickness is deposited on a surface of the substrate, the resin will adhere to the substrate surface and provide a binding surface onto which scintillator layer or other material may be deposited. As such, one of the advantages of the present invention is that various different substrates are suitable for use in the present invention since, for example, the resin coating provides a suitable, low-cost binding surface on which the scintillator material can be effectively deposited as to permit coupling between the scintillator and the substrate. Additionally, the resin coating can have properties such that layers adjacent to the resin coating (e.g., substrate, scintillator, etc.) gain protection from damage and/or degradation due, for example, to physical, mechanical, or chemical stress. Accordingly, the resin coating can serve as both a binding layer and a protective layer.

As such, because the scintillator layer is formed on the same kind of surface (e.g., resin coating) irrespective of the selected substrate, an advantage of the present invention can include a standardization of the scintillator deposition process, thereby providing a controlled and reproducible scintillator binding surface on a substrate with reliable and predictable characteristics. Additionally, the radiation detectors can be produced at a reduced cost due, for example, to the reduced need for extensive processing and polishing of the substrate surface that is traditionally required prior to deposition of a scintillator layer. Furthermore, additional protective properties of the resin coatings, such as resistance to humidity, chemical degradation, and mechanical damage, can increase the durability and utility of the radiation detectors.

Thus, in one aspect of the present invention, a radiation detector is provided. The radiation detector includes a first resin coating formed on a surface of a substrate, and a scintillator layer formed on the resin coating. The resin coating is deposited on a surface of the substrate, the resin will adhere to the substrate surface and provide a binding surface onto which scintillator layer is deposited, thereby forming a binding surface on the substrate for deposition of the scintillator. As set forth above, the resin coating can also act as a protective coating with respect to adjacent or nearby layers (e.g., substrate, scintillator, etc.) including, for example, where the resin coating has properties providing resistance to damage and/or degradation, physical or mechanical stress, or chemical interactions, reactions and the like. For example, the resin coating can be moisture resistant and, therefore, prevent moisture penetration into the scintillator layer and/or substrate. In one embodiment of the present invention, a resin coating includes an organic resin, such as an organic polymer. An organic polymer resin can include materials such as para-xylylene, polyimide or epoxy polymers. Resin coatings can also include films, tapes, and the like and can comprise materials such as polyesters (e.g., Mylar™), polyimides, (e.g., Kapton™), polyvinylidene chlorides (e.g., saran resins or films), and epoxy polymers.

As set forth above, the resin coatings can be formed on a variety of substrates. In one embodiment, the substrate includes compositions such as amorphous carbon, or includes glassy carbon, graphite, aluminum, sapphire, beryllium, or boron nitrate. In another embodiment, the substrate includes a fiber optic plate, prism, lens, scintillator, or photodetector. The substrate can be a detector device or portion or surface thereof (e.g., optical assembly, photodetector, etc.). The substrate can be separate from a detector device and/or comprise a detector portion (e.g., scintillator panel) that can be adapted to or incorporated into a detection device or assembly. In one embodiment, the scintillator is optically, but not physically, coupled to a photodetector.

Scintillators suitable for use in the present invention include any scintillator compositions that can be suitably deposited on a resin coating of the invention. Scintillators can include, for example, CsI(Tl), NaI(Tl), CsI(Na), CsI(Eu), CsBr(Eu), CsI(Tl:Eu), ZnS, ZnS(Ag), ZnSe(Te), LaB$_3$(Ce), LaCl$_3$(Ce), LaF$_3$, LaF$_3$(Ce), ceramic scintillators, and the like. In a particular embodiment, microcolumnar CsI(Tl) is used. In one embodiment, the microcolumnar CsI(Tl) is pixellated, for example, so as to further improve spatial resolution. The scintillator layer will typically have a thickness of about 10 μm to about 5 mm. In one embodiment, a microcolumnar CsI(Tl) scintillator will have a thickness of about 3 mm to about 5 mm (e.g., "thick" scintillator). In other embodiments, the scintillator is a "thin" scintillator, having a thickness of about 10 μm to about 0.5 mm. According to the present invention, the scintillator layer is deposited on the resin coating.

The radiation detector can additionally have one or more coatings formed on a surface of the scintillator coating. In one embodiment, the additional coating can be formed only on a surface of the scintillator layer not in contact with the first resin coating. In another embodiment, the coating can be formed on a surface of the scintillator layer not in contact with the first resin coating as well as additional surfaces of the radiation detector, such as a surface of the substrate or the first resin coating. The additional coating can include a polymer protective layer, a moisture protective barrier, and/or an optically absorptive or reflective layer ("optical layer"), and the like. For example, the radiation detector can further include a second resin coating that is formed on a surface of the scintillator not in contact with the first resin coating. The second resin coating can include a organic polymer, and may include the same or different organic polymer present in the first resin coating.

In another aspect, the present invention includes a radiation detector comprising a substrate, a first resin coating on a surface of the substrate, an optical layer formed on the first resin coating, a second resin coating formed on the optical layer, and a scintillator layer formed on the second resin coating. Resin coatings are as described above, wherein each resin coating comprises an organic polymer. Each resin coating can include the same organic polymer or, alternatively, can include different organic polymers. In a particular embodiment, the organic polymer includes a para-xylylene polymer.

An optical layer according to the present invention includes a layer of material that effects the transmission of photons incident to the optical layer, for example, by either absorbing or reflecting incident light. The optical layer can include, for example, a light absorptive material or a reflective material, and typically comprises an inorganic coating (e.g., metal).

In another aspect, the present invention includes methods of making a radiation detector. A method of making a radiation detector includes forming a first resin coating on a surface of a substrate and depositing a scintillator layer on the resin coating. The substrate can optionally be processed prior to formation of the first resin coating on the substrate. Additional coatings may be formed on the scintillator layer of the detector. For example, a method may further include forming a second resin coating on a surface of the scintillator not in contact with the first resin coating.

In another embodiment, a method of making a radiation detector includes forming a first resin coating on a surface of a substrate, depositing an optical layer on the first resin coating, forming a second resin coating on the optical layer, and depositing a scintillator layer on the second resin coating.

In another aspect, the invention includes methods of performing radiation detection. The method includes providing a radiation detector comprising a substrate, a first resin coating on at least a surface of a substrate and a scintillator layer formed on the resin coating; and positioning a target within a field of view of the radiation detector as to detect emissions from the target. In another embodiment, a method of performing radiation detection includes providing a radiation detector including a substrate, a first resin coating on a surface of the substrate, an optical layer formed on the first resin coating, a second resin coating formed on the optical layer, and a scintillator layer formed on the second resin coating; and positioning a target within a field of view of the radiation detector as to detect emissions from the target.

Emissions detected according to the inventive methods can include, for example, gamma-rays, X-rays, electrons, and the like. Targets for detection can include any source of detectable signal. A target can include e.g., any potential source of detectable emissions, gamma-ray sources (e.g., uranium and the like), X-ray sources, etc. In one embodiment, for example, the radiation detectors can be used for imaging applications including medical imaging such as in a method of performing single photon emission computed tomography (SPECT). In such an embodiment, the imaging method can comprise injecting or otherwise administering a patient with a detectable label and, after a sufficient period of time to allow localization or distribution of the label, placing the patient within the field of view of the detector. Thus, in some embodiments the target includes a patient (e.g., human) or a portion of a patient's body.

For a fuller understanding of the nature and advantages of the present invention, reference should be made to the ensuing detailed description and accompanying drawings. Other aspects, objects and advantages of the invention will be apparent from the drawings and detailed description that follows.

DETAILED DESCRIPTION OF THE INVENTION

Figure 1A:
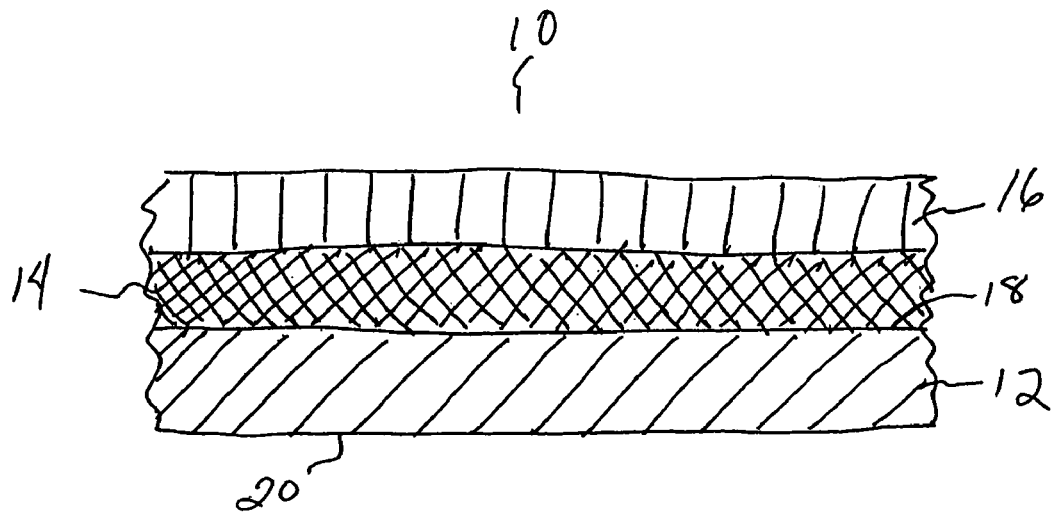
FIGS. 1A and 1B illustrate embodiments of the radiation detector of the present invention.

FIGS. 1A and B are cross-sectional views of a portion of a radiation detector 10 according to an embodiment of the invention. The radiation detector 10 includes a substrate 12, a resin coating 14 on a surface 18 of the substrate, and a scintillator layer 16 formed on the resin coating 14.

The resin coating 14 deposited on the surface 18 of the substrate 12, the resin 14 adheres to the substrate surface 18 and provides a binding surface onto which scintillator material can be deposited. As such, the resin coating 14 is formed on a surface of the substrate 12 onto which deposition of the scintillator layer 16 is desired, although the resin coating 14 can also be formed on additional surfaces of the substrate 12. In some embodiments, the resin coating 14 is absent from a surface or portion of the substrate not having scintillator material 16 deposited thereon, such as a side 20 of the substrate 12 opposite the side having the scintillator layer 16. Surface 18 may also have portions free of resin coating 14. In some instances, resin coating is removed from a portion of the substrate 12 following formation of the coating. For example, following deposition of the scintillator layer 16, resin coating not having scintillator material deposited thereon can optionally be removed.

Generally, a resin coating according to the present invention is of a composition such that, when deposited on a surface of the substrate, will adhere to the substrate and provide a binding surface onto which scintillator material may be deposited. A resin coating can also act as a protective coating with respect to adjacent layers (e.g., substrate, scintillator, etc.) including, for example, where the coating has properties providing resistance to damage and/or degradation, physical or mechanical stress, or chemical interactions, reactions, and the like. For example, a resin coating can be moisture resist and, therefore, can prevent moisture penetration into the scintillator layer and/or substrate. Resin coatings will generally match the contours of the surface to which they are applied (e.g., substrate surface), but in some cases can smooth or improve the "flatness" of a surface. A resin coating is typically about 5 to about 20 microns in thickness.

Various resin materials are known in the art and can be used in forming resin coatings. The resin coating typically includes an organic polymer resin. In a particular embodiment, the resin coating includes a para-xylylene polymer composition. Various para-xylylene polymer compositions are known and include, for example, compositions known by the trade name "parylene" including, for example, poly-para-xylylene (trade name "Parylene N", such as available from Paratronix, Inc, Attleboro, Mass.) and poly-monochoro-para-xylylene (trade name "Parylene C", such as available from Paratronix, Inc, Attleboro, Mass.) Resin coatings can also include films, tapes, and the like and can comprise materials such as polyesters (e.g., Mylar™), polyimides, (e.g., Kapton™), polyvinylidene chlorides (e.g., saran resins or films), and epoxy polymers. Other organic polymer, including those commonly used as conformational coatings, will be suitable for use as resin coatings according to the present invention.

The resin coating can be formed on a variety of substrates. Substrates can vary in material characteristics such as shape, surface texture and/or finish, purity, dopant composition, density, construction (e.g., solid, corrugated, frothed, etc.), hardness, susceptibility to reaction with or absorption of water (e.g., vapor) as well as other chemicals, and sensitivity to temperature. Moreover, the various substrates may vary with regard to energy (e.g., X-rays, gamma-rays, etc.) and/or light transmission properties including, for example, translucency or opacity, as well as index of refraction of incident light photons. As such, various substrate materials may vary with respect to their suitability for direct deposition of scintillator material and, in some cases, may require additional and costly processing steps prior to deposition of a scintillator layer. Non-limiting examples of substrate materials that can be used with the detectors of the present invention are shown in Table I.

TABLE I

| Substrate | Comments/Examples |
| --- | --- |
| Glass, any type | Example glasses include crown glass, fused quartz, etc. |
| Fiber optic glass, any type (e.g., with or without Extra Mural Absorber (EMA)) | Glass slab comprising fibers oriented vertically to the slab surface. |
| Fiber optic conduit | End shapes concave, convex, compound, etc. |
| Fiber optic tapers | End shapes concave, convex, compound, etc. |
| Amorphous carbon | |
| Glassy carbon (e.g., solid) | |
| Glassy carbon (e.g., coating) | A coating on top of graphite or other material. May be used as a deposition surface or used to seal porosities in the substrate (e.g., Graphite). |
| Graphite | |
| Carbon | Any form of carbon other than those otherwise mentioned. |
| Mylar ™ film | |
| Aluminized (Mylar ™) film | |
| Retroreflective film | A polymer film embossed with retroreflective prisms- e.g., 3 to 5 microns in thickness. |
| Silicon (e.g., wafers) | |
| Metal (e.g., aluminum) | Substrate can act as a reflective layer. |
| Lenses (e.g., glass, plastic, Fresnel, conventional, etc.) | Lenses may be used, for example, to focus scintillation light. Resin coating and scintillator layer (e.g., film) may be applied to the front or back of the lens. |
| Plastics | Suitable plastics typically include those that can withstand the temperatures and other conditions of deposition and which do not outgas (e.g., Teflon ™, Kapton ™, Delrin ™, and Polymethyl methacrylate (PMMA)). |
| Ceramic plates | |
| Membranes | Membranes may be used to cover and even conform to a surface to suit a particular temporary or long-term detection need. Examples include Latex, polyethylene, polyurethane, silicone, etc. |
| Gadolinium ($^{157}$Gd) foils | Converts neutrons to gamma rays, electrons, Auger electrons and X-rays, which are converted to visible light by the scintillator film. |
| Boron ($^{10}$B)-enriched substrate materials | Converts neutrons to gamma rays, electrons, Auger electrons and X-rays, which are converted to visible light by the scintillator film. |

TABLE I-continued

| Substrate | Comments/Examples |
|---|---|
| Detector readout | E.g., a: Si—H. |
| Scintillators (inorganic; glass, films, crystals, etc.) | One scintillator (e.g., CsI(Tl)) can deposited onto another scintillator, separated by a resin coating layer, to enable dual- or multiple-energy detection by utilizing the radiation-to-light conversion properties of each different scintillator. Three or more such layers may be grown. Example scintillators include CsI(Tl), NaI(Tl), CsI(Na), CsI(Eu), CsI(Tl: Eu), ZnS, LaB, LaF$_3$ (lanthanum fluoride) and ceramic scintillators. |
| Photodetectors | Convert scintillator light to measurable electrical signal. E.g., CCD, CMOS, CID (charged injection device), PSPMT, PMT. |
| Amorphous Selenium direct detectors | |

A substrate can include compositions such as amorphous carbon, or includes glassy carbon, graphite, aluminum, sapphire, beryllium, or boron nitrate. Additional examples can include a fiber optic plate, prism, lens, scintillator, or photodetector. The substrate can be a detector device or portion or surface thereof (e.g., optical assembly, photodetector, etc.). The substrate can be separate from a detector device and/or comprise a detector portion (e.g., scintillator panel) that can be adapted or optically coupled to, or incorporated into a detection device (e.g., photodetector) or assembly.

The substrate may be processed and/or modified prior to application of the resin coating to the substrate surface. For example, a substrate surface can optionally be processed in order to refine substrate surface conformation, such as to even the substrate surface and remove projections/recesses present on the substrate surface. In some instances, for example, substrate processing may be preformed in order to enhance coating adhesion, and/or scintillator adhesion. In some instances, such processing of a substrate surface can improve adhesion characteristics between the resin coating and the substrate, thereby preventing detachment or peeling of the resin from the substrate surface. Non-limiting examples of processing include chemical etching, sandblasting, laser etching, laser patterning, cleaned (e.g., plasma cleaning procedures), and the like.

A variety of different scintillators may be used in forming a scintillator layer on a radiation detector of the present invention. Scintillators can include, for example, CsI(Tl), NaI(Tl), CsI(Na), CsI(Eu), CsBr(Eu), CsI(Tl:Eu), ZnS, ZnS(Ag), ZnSe(Te), LaB$_3$(Ce), LaCl$_3$(Ce), LaF$_3$, LaF$_3$(Ce), ceramic scintillators, and the like. In a particular embodiment of the present invention, the radiation detector includes a scintillator layer having a CsI(Tl) scintillator, such as a microcolumnar CsI(Tl) scintillator (Nagarkar et al., *IEEE Trans. Nucl. Sci.* 44:492 (1998); Nagarkar et al., *IEEE Trans. Nucl. Sci.* 44:885 (1997)). Furthermore, a microcolumnar layer may be pixellated, for example, so as to further improve spatial resolution. Thus, in one embodiment, the scintillator layer includes a pixellated micro-columnar film scintillator. A scintillator layer can include, for example, a pixellated micro-columnar CsI(Tl) scintillator. For further discussion of pixellated microcolumnar film scintillators see, for example, Nagarkar et al., SPIE, Physics of Medical Imaging, Vol. 4, No. 21, pp 541-546, (2003); and Shestakova et al., IEEE Trans. Nucl. Sci., Vol. 52, NO 4., Aug. (2005). See also, commonly owned U.S. Pat. No. 6,921,909, which is incorporated herein by reference.

Figures 2A, 2B:
FIGS. 2A and 2B provide SEM micrographs of various microcolumnar CsI(Tl) films.

FIGS. 2A and 2B provide SEM micrographs of representative microcolumnar CsI(Tl) films having a thickness of about 220 μm (FIG. 2A) and 1.45 mm (FIG. 2B) showing a columnar structure. The illustrated microcolumnar CsI(Tl) film allows for fabrication of thick films in order to enhance the energy signal absorption while minimizing the lateral light spread within the screen, thereby maintaining an excellent spatial resolution. The high density and high average atomic number of CsI(Tl) converts incident radiation into light with high efficiency and the microcolumnar structure channels the scintillation light by total internal reflection to the detection device (e.g., CCD). The conversion gain of CsI(Tl) is ~60,000 photons/MeV. Furthermore, the scintillator structure can be made sufficiently thick (e.g., 3 mm to 4 mm) to absorb a significant fraction, e.g., about 70% or more, of incident high energy gamma radiation without sacrificing the spatial resolution, overcoming the traditional tradeoff between these quantities. Thus, a combination of the high stopping power (e.g., 70% or higher) and high light output (e.g., 50,000 photons/MeV), along with the excellent light channeling properties of microcolumnar CsI(Tl) (evident from its spatial resolution measurements) allow detection of energetic photons (e.g., X-rays, gamma-rays, etc.) with high efficiency, high signal-to-noise ratio (SNR), and high spatial resolution.

The microcolumnar CsI(Tl) scintillator converts incident energy signals into visible light with very high efficiency and, by virtue of its structure channels the light, for example, toward an operatively coupled photodetector. This minimizes the traditional tradeoff between spatial resolution and detection efficiency. Furthermore, with its fast scintillation decay, the CsI(Tl) allows rapid imaging (e.g., x-ray, etc.) without image blurring arising from residual intensity from previous exposures. Thus, the combination of a microcolumnar CsI (Tl) scintillator and an optically coupled detector can provide very high sensitivity, for example with a range of about 90% to about 95%, high spatial resolution, such as for example, from about 50 to about 70 μm, and a substantially improved signal to noise ratio ("SNR") (e.g., an improvement of about a 10 times) and high spatial resolution.

Scintillators used in the inventive radiation detectors may be suitable for use in high-speed imaging applications. In high-speed imaging applications, for example, a premium is placed on the x-ray to light conversion efficiency, the speed of emission or decay time, and the x-ray stopping power of the scintillator. CsI(Tl) has high light conversion efficiency, a fast decay time, good x-ray stopping properties, and is easily fabricated. Table VI lists some properties of CsI(Tl) compared to other scintillators in use.

TABLE II

| Material | Light Output (Photons/ MeV) | Wave-length of Emission (nm) | Attenuation Length (511 keV) (cm) | Initial Photon Intensity (Photons/ (ns × MeV)) | Principal Decay Time (ns) |
|---|---|---|---|---|---|
| NaI(Tl) | 38,000 | 415 | 3.3 | 165 | 230 |
| CsI(Tl) | 64,000 | 540 | 1.9 | 50 | 1000 |
| LSO | 24000 | 420 | 1.2 | 600 | 40 |
| BGO | 8,200 | 505 | 1.1 | 30 | 300 |
| BaF$_2$ | 10,000~ 2,000 fast | 310 slow 220 fast | 2.3 | 3,400 (total) | 620 slow 0.6 fast |
| GSO | 7,600 | 430 | 1.5 | 125 | 60 |
| CdWO$_4$ | 15,000 | 480 | 1.1 | 3 | 5000 |
| YAP | 20,000 | 370 | 2.1 | 570 | 26 |

The thickness of the scintillator layer will depend, in part, on the desired use of the radiation detector. For example, the scintillator layer will have a thickness of about 10 µm to about 5 mm. In one embodiment, a microcolumnar CsI(Tl) scintillator will have a thickness of about 3 mm to about 5 mm (e.g., "thick" scintillator). In other embodiments, the scintillator is a "thin" scintillator, having a thickness of about 10 µm to about 0.5 mm. As can be appreciated, the terms "thick" and "thin" are relative terms, and the thickness of a "thick" CsI (Tl) scintillator layer will merely be thicker than the desired spatial resolution. Because the columnar structure of the CsI (Tl) scintillator layer, the columns channel light mostly along the columns, so that the resolution is determined by column diameter, instead of the thickness of the layer, and the thickness can therefore be higher without detrimentally affecting the resolution.

In one embodiment, for example, a radiation detector of the invention may be used for X-ray detection, where incident X-rays have energies ranging from about 30 kVp to about 65 kVp, and scintillator films of various thickness in the range of 100 µm to 2 mm are deposited to ensure >90% absorption of X-rays. For $^{125}$I with about 27.2 to 31 keV emission energies, films of 250 µm thickness (approximately 70% absorption) and/or 500 µm (approximately 93% absorption) with microcolumnar diameters in the range of 5 to 10 µm can be used. (Nagarkar et al., *IEEE Trans. Nucl. Sci.* 44:492 (1998); Nagarkar et al., *IEEE Trans. Nucl. Sci.* 44:885 (1997)). On the other hand, for 140 keV $^{99m}$Tc gamma rays 3 mm to 4 mm thick films (approximately 70% absorption) with column diameters in the range of 30 to 40 µm can be used. This increased column diameter ensures excellent light channeling in very thick structures. Planetary systems which holds the substrates in the vapor deposition chamber may be used to obtain better than 0.3% CsI(Tl) film thickness non-uniformity.

Scintillator materials forming a scintillator layer of the present invention typically include a "dopant" that can effect certain properties, such as physical properties (e.g., brittleness, and the like) as well as scintillation properties (e.g., luminescence, light yield, resolution, and the like), of the scintillator materials. For example, in embodiments where the scintillator layer include a CsI(Tl) film (e.g., vapor deposited film), thallium concentration can be an important parameter to control, for example, in order to ensure suitable deposition of the scintillator material. Control of dopant concentration in vapor deposited films can be accomplished by co-evaporating the dopant with the scintillator material. For example, thallium can be co-evaporated with CsI. For high light yield in CsI(Tl) films, a higher dopant (Tl) concentration (e.g., about 0.5 to about 0.7% by molar weight) can be used. For high resolution, a moderate dopant (Tl) concentration can be incorporated in the scintillator layer (e.g., about 0.2 to about 0.3% by molar weight). Resulting films can be annealed, for example, to ensure response uniformity over the scintillator layer. Additional techniques for depositing scintillator compositions can include, for example, flash evaporation techniques, including where properly doped material is dropped into a hot boat and instantly evaporated and, therefore, the composition of the scintillator film remains the same as the source. Scintillator compositions can also be deposited by pulse laser evaporation in order to form the scintillator layer.

Figure 1B:
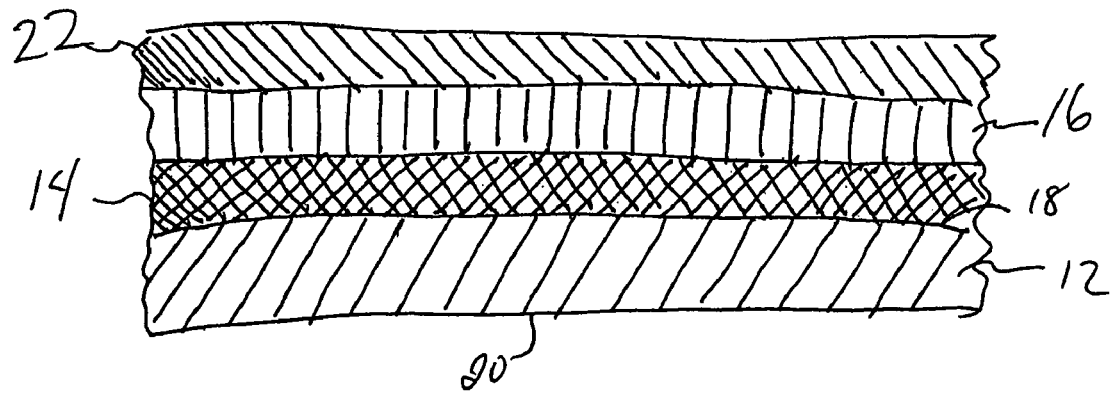

The radiation detector can additionally have one or more coatings formed on a surface of the scintillator coating. The coating can be formed only on a surface of the scintillator layer not in contact with the first resin coating, but may be formed on additional surfaces of the radiation detector, such as a surface of the substrate not having a first resin coating or directly the first resin coating. In some embodiments, the additional coating is absent from a surface or portion of the substrate not having scintillator material deposited thereon (e.g., via a resin binding layer), such as a side of the substrate opposite the side having the scintillator layer. The additional coating can include, e.g., a polymer protective layer, a moisture protective barrier, and/or an optically absorptive or reflective layer. As illustrated in FIG. 1B, the radiation detector can further include a second resin coating 22 formed on a surface of the scintillator layer 16 not in contact with the first resin coating 14. The second resin coating 22 can include a organic polymer (see above), and may include the same or different organic polymer present in the first resin coating 14.

An additional embodiment of a radiation detector 30 of the invention is described with reference to FIGS. 3A through 3E. In making the radiation detector 30, an appropriate substrate 32 is provided onto which a first resin coating 34 is deposited. The substrate 32 may be processed and/or modified prior to application of the resin coating 34 to the substrate surface (see above). Once the first resin coating 34 is formed on a substrate surface, additional coatings may be formed on a surface of the first resin coating. Additional coatings may include, for example, a coating of scintillator material as illustrated in FIGS. 1A and B or other coatings, such as an optically absorptive or reflective layer 36 (see, e.g., FIG. 3B). A second resin coating 38 can be formed on the optical layer 36 (see, e.g., FIG. 3C). A second resin coating 38 provides a surface onto which to form additional coatings and/or provide a barrier between the optical layer 36 and additional coatings (e.g., scintillator material). In one embodiment, a scintillator layer 40 can be formed on the second resin coating 38 (see, e.g., FIG. 3D). As set forth above, certain coatings, such as reflective coatings (e.g., silver, aluminum, etc.) may be reactive with scintillator materials, such as CsI scintillator compositions, which can cause discoloring or tarnishing of the reflective coating. Thus, the second resin layer 38 formed between the reflective or absorptive layer 36 and the scintillator layer 40.

Figure 3A:
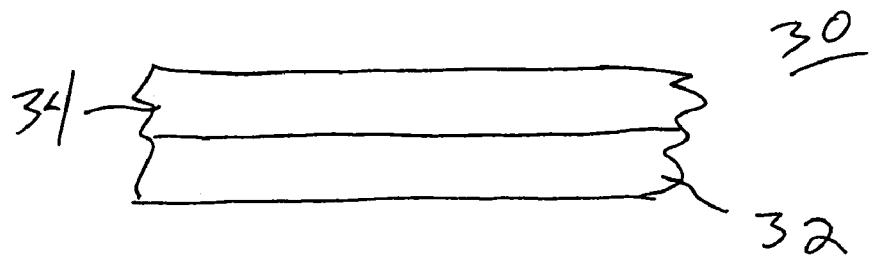
FIGS. 3A through 3E shows an embodiment of the radiation detector of the present invention illustrating various layers of the detector.
Figure 3B:
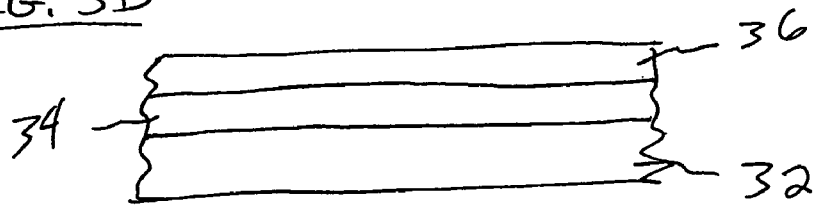
Figure 3C:
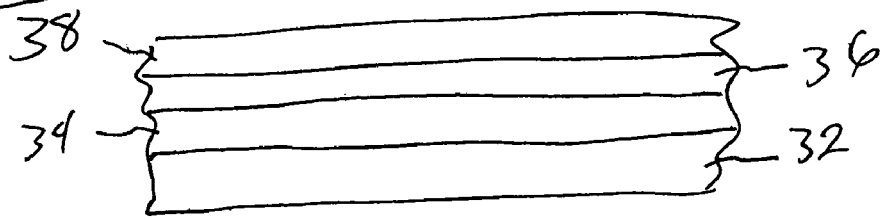
Figure 3D:
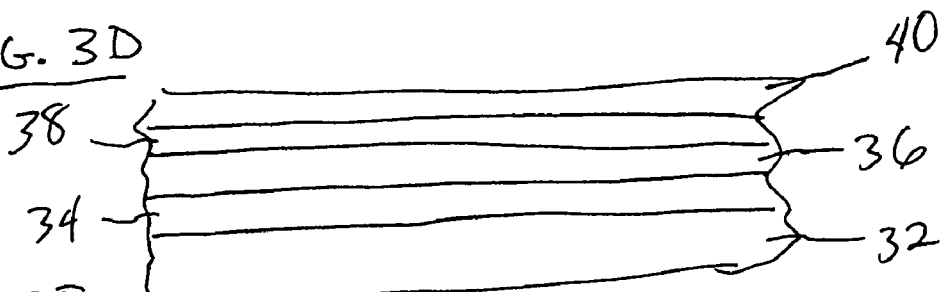
Figure 3E:
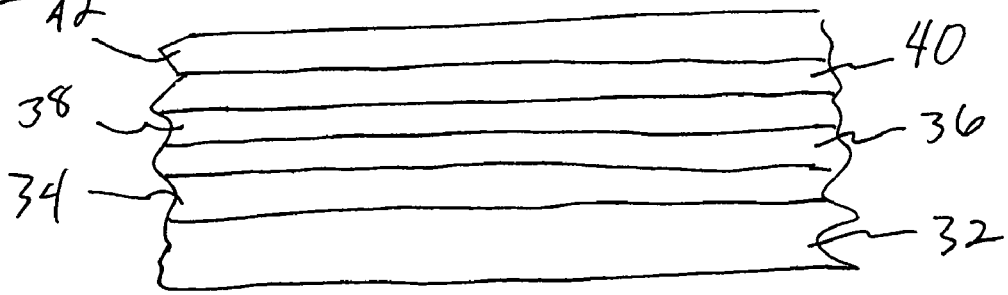

Additional layers can be formed on the scintillator material (see, e.g., FIG. 3E). For example, a third resin coating 42 can be formed on the scintillator layer 40. The third resin coating 42 can be formed only on a surface of the scintillator layer not in contact with other layers, such as the second resin coating 38, but may also be formed on additional surfaces of the radiation detector. Similar to above, an additional coating, such as the third resin coating 42, may be absent from a surface or portion of the substrate not having scintillator material deposited thereon (e.g., via a resin binding layer), such as a side of the substrate opposite the side having the scintillator layer.

Thus, following deposition, a layer (e.g., resin layer, scintillator layer) can be coated with an additional layer, such as an optically absorptive or reflective layer ("optical layer"). An optical layer typically includes inorganic materials, such as metals, and the like. A light absorptive layer may be useful, for example, for absorbing light which might otherwise degrade resolution. A light-reflective can be used, e.g., to reflect incident light back into a deposited scintillator so that a greater portion of the light exits the scintillator material at a desired alternative location, which can increase the detected signal, thereby improving signal-to-noise ratios.

In one embodiment, a resin layer or scintillator layer (e.g., microcolumnar CsI(Tl) film layer) can be coated with a reflective layer(s), such as inorganic material, $Al_2O_3$, aluminum, white paint, and the like, and/or a moisture protective barrier, such as for example silicon monoxide (SiO), silicon nitride ($Si_3N_4$), zirconium oxide (ZrO), silicon dioxide ($SiO_2$), and the like. To achieve highly reflective coat, 250 nm thick, three and one half to five and one half bi-layers of SiO and $Si_3N_4$ ($n_{SiO}$=1.4 and $n_{Si3N4}$=1.6 to 2.1) can be formed. The order and thickness of each of these layers can be tailored to alter reflection/transmission properties of the coatings. These can be formed, for example, using a plasma enhanced chemical vapor deposition (PECVD) technique.

As set forth above, the substrate can be separate from a detector device and/or comprise a detector portion, such as a scintillator panel, that can be adapted or optically coupled to, or incorporated into a detection device or assembly. For example, the scintillator layer formed on the detector can be optically coupled to one or more photodetectors. Non-limiting examples of photodetectors include photmultiplier tubes (PMT), photodiodes, charge coupled device (CCD) sensors, image intensifiers, and the like. Choice of a particular photodetector will depend in part on the type of radiation detector being fabricated, and on the intended use of the device. Technologies for operably coupling a scintillator and photodetector, or integrating a radiation detector (e.g., scintillator panel) into a detector assembly are known and need not be described in detail here. For non-limiting examples of techniques for operably coupling detectors containing a scintillator to a photodetector or detector assembly see, e.g., U.S. Pat. No. 5,171,996 and U.S. Pat. No. 6,469,305. See, also, commonly owned U.S. patent application Ser. No. 11/158,938, which is incorporated herein by reference.

One embodiment of the present invention involves formation of a resin coating, followed by vapor-deposition of CsI (Tl) on a fiber optic faceplate and a low cost graphite substrate. The black surface of the substrate material minimizes optical scatter at the CsI-carbon interface, thereby improving the spatial resolution. Due to its black color, amorphous carbon substrates reduce the total light output, but provide an excellent spatial resolution. A reflective substrate may be formed by vapor deposition of a high reflectance material such as, for example, aluminum or $TiO_2$ on graphite, and a resin coating formed thereon, prior to CsI(Tl) deposition on the resin coating. The fiber optic faceplates with 6 µm fibers and interstitial extramural absorption fibers (EMA) can be obtained from sources such as Incom, Inc., Southbridge, Mass. The substrates can be subjected to processing, such as plasma cleaning procedures, to ensure good resin adhesion. In one embodiment, up to 40×40 cm² and up to 3+mm thick screens are produced.

The radiation detectors can be connected to a variety of tools and devices, as mentioned previously, and used in various methods of radiation detection. Non-limiting examples include nuclear weapons monitoring and detection devices, geological exploration devices, such as well-logging tools, and imaging devices, such as nuclear medicine devices (e.g., single photon emission computed tomography (SPECT), X-ray computed tomography (CT), and the like).

Imaging devices, including medical imaging equipment, such as the SPECT devices as mentioned above, represent a particular application for invention radiation detectors. In SPECT applications, a radiopharmaceutical or detectable label is administered to a patient and may become concentrated within a specific tissue or organ. Radionuclides from the compound decay and emit gamma-rays. The SPECT camera can locate the origin of these gamma-rays and thereby reconstruct an image of the tissue/organ for observation. The detector modules usually include a number of "cameras" or "detectors" along with the associated circuitry for detecting gamma-rays and reconstructing an image of the patient's tissue or organ, which can include the radiation detectors of the present invention.

The detectors of the invention are also useful, for example, in other applications where fast decay of the light signal is desirable. One such application is X-ray computed tomography (CT), where, as the number and area of the detectors increase, lower cost materials with adequate characteristics become important.

The detectors may also be connected to a visualization interface, imaging equipment, digital imaging equipment (e.g., pixellated flat panel devices). In some embodiments, the scintillator layer may serve as a component of a screen scintillator. For example, a scintillator layer could be formed into a relatively flat place, which is attached to a film, such as photographic film. Energy radiation, e.g., X-rays, originating from a source would interact with the scintillator and be converted into light photons, which are developed on the film.

It is understood that the examples and embodiments described herein are for illustrative purposes only and that various modifications or changes in light thereof will be suggested to persons skilled in the art and are to be included within the spirit and purview of this application and scope of the appended claims. Numerous different combinations are possible, and such combinations are considered to be part of the present invention.

What is claimed is:

1. A radiation detector comprising a substrate, a first para-xylylene polymer resin coating formed on at least a surface of a substrate and a scintillator layer formed only on the resin coating by a process comprising vapor depositing the scintillator layer on the resin coating.

2. The radiation detector of claim 1, wherein the scintillator layer is optically coupled to a photodetector.

3. The radiation detector of claim 1, wherein the substrate comprises amorphous carbon, glassy carbon, graphite, aluminum, sapphire, beryllium, or boron nitrate.

4. The radiation detector of claim 1, wherein the substrate comprises a fiber optic plate, prism, lens, scintillator, or photodetector.

5. The radiation detector of claim 1, wherein the scintillator layer comprises CsI(Tl).

6. The radiation detector of claim 5, wherein the scintillator layer comprises microcolumnar CsI(Tl).

7. The radiation detector of claim 6, wherein the scintillator layer comprises pixilated microcolumnar CsI(Tl).

8. The radiation detector of claim 1, further comprising a second resin coating formed on a surface of the scintillator layer not in contact with the first resin coating.

9. A radiation detector comprising a substrate, a first resin coating on a surface of the substrate, an optical layer formed on the first resin coating, a second resin coating formed on the optical layer, and a scintillator layer formed only on the second resin coating by a process comprising vapor depositing the scintillator layer on the second resin coating, wherein the second resin coating is a para-xylylene polymer resin.

10. The radiation detector of claim 9, wherein the first resin coating comprises a para-xylylene polymer.

11. The radiation detector of claim 9, wherein the optical layer comprises a light absorptive material.

12. The radiation detector of claim 9, wherein the optical layer comprises a reflective material.

13. The radiation detector of claim 9, wherein the optical layer comprises an inorganic coating.

14. The radiation detector of claim 9, wherein the substrate comprises amorphous carbon, glassy carbon, graphite, aluminum, sapphire, beryllium, boron carbide, a fiber optic plate, prism, lens, scintillator, or photodetector.

15. The radiation detector of claim 9, wherein the scintillator layer comprises CsI(Tl).

16. The radiation detector of claim 9, further comprising a third resin coating formed on the scintillator layer.

17. The radiation detector of claim 9, wherein the third resin coating is formed on a surface of the scintillator layer not in contact with the second resin coating.

18. A radiation detector comprising a substrate, a scintillator layer, and a para-xylylene polymer resin coating disposed between the substrate and the scintillator, wherein the scintillator layer is formed only on the polymer by a process comprising vapor depositing the scintillator layer on the resin coating.

19. A method of making a radiation detector, comprising forming a first para-xylylene polymer resin coating on a surface of a substrate; and depositing a scintillator layer formed only on the resin coating by a process comprising vapor depositing the scintillator layer on the resin coating.

20. A method of making a radiation detector, comprising:
forming a first resin coating on a surface of a substrate;
depositing an optical layer on the first resin coating;
forming a second para-xylylene polymer resin coating on the optical layer; and
vapor depositing a scintillator layer only on the second resin coating.

21. A method of performing radiation detection, comprising:
providing a radiation detector comprising a substrate, a first para-xylylene polymer resin coating on at least a surface of a substrate and a scintillator layer formed only on the resin coating by a process comprising vapor depositing the scintillator layer on the resin coating; and
positioning a target within a field of view of the scintillator as to detect emissions from the target.

22. A method of performing radiation detection, comprising:
providing a radiation detector comprising a substrate, a first resin coating on a surface of the substrate, an optical layer formed on the first resin coating, a second para-xylylene polymer resin coating formed on the optical layer, and a scintillator layer formed only on the second resin coating by a process comprising vapor depositing the scintillator layer on the second resin coating; and
positioning a target within a field of view of the scintillator as to detect emissions from the target.

* * * * *